United States Patent
Usami et al.

(10) Patent No.: US 6,808,782 B2
(45) Date of Patent: Oct. 26, 2004

(54) OPTICAL INFORMATION RECORDING MEDIUM

(75) Inventors: Yoshihisa Usami, Kanagawa (JP); Toshio Ishida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 41 days.

(21) Appl. No.: 10/382,995

(22) Filed: Mar. 7, 2003

(65) Prior Publication Data

US 2003/0203147 A1 Oct. 30, 2003

(30) Foreign Application Priority Data

Mar. 7, 2002 (JP) ........................................ 2002-061953
Jan. 21, 2003 (JP) ........................................ 2003-011992

(51) Int. Cl.[7] ................................................. B32B 3/02
(52) U.S. Cl. .................... 428/64.1; 428/64.4; 428/64.8; 430/270.14
(58) Field of Search ................................ 428/64.1, 64.4, 428/64.8, 913; 430/270.14, 495.1, 945

(56) References Cited

U.S. PATENT DOCUMENTS

| 5,075,145 A | 12/1991 | Yamamoto et al. | |
| 6,576,320 B2 * | 6/2003 | Hayashida et al. | ........ 428/64.1 |
| 2002/0145967 A1 * | 10/2002 | Fujii et al. | ............... 369/275.4 |

FOREIGN PATENT DOCUMENTS

EP       1 154 413 A        11/2001

* cited by examiner

*Primary Examiner*—Elizabeth Mulvaney
(74) *Attorney, Agent, or Firm*—Sughrue Mion, PLLC

(57) ABSTRACT

An optical information recording medium including a substrate having a groove that has a track pitch of 200 to 400 nm and a depth of 10 to 150 nm, the substrate having successively disposed thereon a light-reflective layer, a recording layer and a cover layer, wherein information is recordable and reproducible by irradiating a laser beam having a wavelength of 500 nm or less from a side of the medium disposed with the cover layer, and the light-reflective layer contains aluminum or an aluminum alloy.

20 Claims, No Drawings

OPTICAL INFORMATION RECORDING MEDIUM

BACKGROUND OF THE INVENTION

1. Field of the Invention

The present invention relates to an optical information recording medium, and more specifically to an optical information recording medium writable only once by heat mode.

2. Description of the Related Art

An optical information recording medium (optical disc) on which information can be written only once by irradiation with laser beam is widely known. Such an optical disc is called a writable CD (so called CD-R), and typically comprises a transparent disc substrate having successively disposed thereon a recording layer including an organic dye, a light-reflective layer including a metal such as gold, and a protective layer (cover layer) made of a resin. Information is recorded on such a CD-R by irradiating the CD-R with a near-infrared laser beam (usually laser beam having a wavelength of around 780 nm). Specifically, a portion of the recording layer that is irradiated absorbs light, whereby the temperature rises at the irradiated portion. The rise in temperature produces a physical or chemical change (e.g., formation of pits) to alter the optical properties of the irradiated portion, whereby information is recorded. The information thus recorded on the CD-R is ordinarily reproduced by irradiating the CD-R with laser beam having the same wavelength as that of the laser beam used to record the information and detecting a difference in reflectance between regions of the recording layer whose optical properties have been changed (recorded portions) and regions of the recording layer whose optical properties have not been changed (unrecorded portions).

In recent years, there has been a demand for optical information recording media having higher density, and writable digital versatile discs (DVD-Rs) have been proposed in response to that demand (*Nikkei New Media*, extra issue entitled "DVD", 1995). A DVD-R typically comprises two transparent disc substrates that each have successively disposed thereon a recording layer containing an organic dye, a light-reflective layer, and a protective layer, with the discs being adhered so that the recording layers face inward or so that protective substrates having the same disc shape as these discs are disposed on outer sides of the adhered discs. Moreover, the transparent disc substrate includes a guide groove (pre-groove) used for tracking a laser irradiated onto the CD-R, with the groove having a narrow track pitch (0.74 to 0.8 $\mu$m) that is equal to or less than half of that in a CD-R. Information is recorded and reproduced (played back) by irradiating the DVD-R with laser beam in a visible region (usually laser beam having a wavelength region ranging from 630 to 680 nm), whereby information can be recorded at a higher density than on a CD-R.

Recently, high-vision television and networks such as the Internet have rapidly become more widespread. In addition, the start of HDTV (High Definition Television) broadcasting is near at hand. As a result, large-capacity optical recording media capable of recording visual information easily and inexpensively are in demand. While DVD-Rs currently play a significant role as large-capacity recording media, the demand for media having greater recording capacity and higher density continues to escalate, and development of recording media that can cope with this demand is also needed. For this reason, development of recording media having ever greater storage capacity with which high-density recording can be effected with short-wave light continues to advance.

Methods for recording information on and reproducing information from an optical information recording medium including a recording layer containing an organic dye, by irradiating the medium, from a side of the medium disposed with the recording layer towards a side of the medium disposed with a light-reflecting layer, with laser beam having a wavelength of 530 nm or less, are disclosed in, for example, Japanese Patent Application Laid-Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028. In these methods, information is recorded on and reproduced from an optical disc having a recording layer containing a porphyrin compound, an azo-based dye, a metal azo-based dye, a quinophthalone-based dye, a trimethine cyanine dye, a dicyanobiphenyl-skeleton dye, a coumarin dye, a naphthalocyanine compound or the like, by irradiating the optical disc with a blue laser (having a wavelength of 430 nm or 488 nm) or a blue-green laser (having a wavelength of 515).

However, the present inventors have found that practically employable sensitivity cannot be obtained with the optical discs disclosed in the above publications when information is recorded thereon by irradiating the optical discs with a short-wave length laser beam having a wavelength of 450 nm or less, and that sufficient levels cannot be achieved with respect to other recording characteristics such as reflectance and modulation. In particular, it was confirmed that recording characteristics of the optical discs disclosed in the above publications decreased when the discs were irradiated with laser beam having a wavelength of 450 nm or less.

Currently, studies are being undertaken to improve the reflectance of the optical discs described in the above-listed publications by using silver (Ag) in the light-reflective layer. However, use of Ag in the light-reflective layer involves increased costs, and hence a significant problem arises if such optical discs are mass produced. Further, the light-reflective layer including Ag poses a problem of a lowered resistance to corrosion depending on the conditions for forming the layer.

SUMMARY OF THE INVENTION

In view of the foregoing, it is an object of the present invention to provide an optical information recording medium that exhibits excellent recording characteristics and achieves cost-reduced production by including aluminum or an aluminum alloy in a light-reflective layer.

The object is attained by the invention described below.

The invention provides an optical information recording medium comprising a substrate including a groove that has a track pitch of 200 to 400 nm and a depth of 10 to 150 nm, the substrate having successively disposed thereon a light-reflective layer, a recording layer and a cover layer, wherein information is recordable and reproducible by irradiating a laser beam having a wavelength of 500 nm or less from a side of the medium disposed with the cover layer, and the light-reflective layer contains aluminum or an aluminum alloy.

In the optical information recording medium according to the invention, the light-reflective layer preferably has a thickness of 20 to 200 nm and is formed at a layer-forming rate of 6 to 95 nm/s.

DESCRIPTION OF THE INVENTION

An optical information recording medium of the present invention comprises a substrate including a groove that has a track pitch of 200 to 400 nm and a depth of 10 to 150 nm, the substrate having successively disposed thereon a light-reflective layer, a recording layer and a cover layer, wherein information is recordable and reproducible by irradiating a laser beam having a wavelength of 500 nm or less from a side of the medium disposed with the cover layer, and the light-reflective layer contains aluminum or an aluminum alloy.

The optical information recording medium of the invention will be described below in more detail.

Light-reflective Layer

The light-reflective layer is disposed in order to improve the reflectance when information is reproduced. In the invention, it is necessary that the light-reflective layer contains aluminum or an aluminum alloy which is less expensive as compared with silver (Ag) or gold (Au). The light-reflective layer that contains aluminum or an aluminum alloy has a reflectance with respect to a laser beam of preferably 70% or more, more preferably 75% or more, and particularly preferably 80% or more.

Examples of the aluminum and the aluminum alloy used in the light-reflective layer include pure aluminum at a purity of 99.0% or higher, that is used as industrial aluminum, and the alloys containing aluminum as the main ingredient and a trace amount of foreign elements. Pure aluminum is preferred from the standpoint of the reflectance.

The aluminum alloy preferably contains one or more of elements selected from those described in the periodic table in a trace amount ranging from 0.1% to 10% by mass. Representative examples of the foreign element present in the aluminum alloy include silicon (Si), iron (Fe), copper (Cu), manganese (Mn), magnesium (Mg), chromium (Cr), zinc (Zn), zirconium (Zr), titanium (Ti), vanadium (V), nickel (Ni), bismuth (Bi), silver (Ag), gold (Au) and platinum (Pt).

Among them, preferred foreign elements are Si and Mg, as well as Ag, Au, Pt and Cu present in the aluminum alloy at 1% by mass or less, in order not to decrease the reflectance.

The aluminum and aluminum alloy can be formed as a light-reflective layer on a substrate by vapor deposition, sputtering or ion plating. Preferably, the light-reflective layer is formed by sputtering.

Hereinafter, there will be detailed a method of forming a light-reflective layer in the optical information recording medium of the invention through sputtering.

As a discharging gas used for sputtering, Ar is preferably employed. The light-reflective layer is formed under the sputtering conditions preferably of an Ar flow rate of 1 to 50 sccm, a power of 0.5 to 10 kW and a layer-forming time of 0.1 to 30 sec, more preferably of an Ar flow rate of 3 to 20 sccm, a power of 1 to 7 kW and a layer-forming time of 0.5 to 15 sec, and still more preferably of an Ar flow rate of 4 to 10 sccm, a power of 2 to 6 kW and a layer-forming time of 1 to 5 sec.

Preferably, at least one of the sputtering conditions of the Ar flow rate, the power and the layer-forming time falls within the above-specified range, more preferably two or more conditions, and still more preferably all of the conditions fall within the above-specified range.

If the light-reflective layer is formed under such sputtering conditions, the reflectance is improved and the resistance to corrosion is further enhanced, whereby the optical information recording medium having excellent recording characteristics can be obtained.

The light-reflective layer has a thickness preferably of 20 to 200 nm, more preferably of 30 to 180 nm, and particularly preferably of 35 to 160 nm. If the layer thickness is less than 20 nm, there may arise problems in that the desired reflectance cannot be obtained, the reflectance is lowered during storage, and sufficient recording amplitude cannot be obtained. If the layer thickness exceeds 200 nm, the surface may be roughened to occasionally lower the reflectance.

The layer-forming rate for the light-reflective layer preferably falls within a range from 6 to 95 nm/s, more preferably within a range from 7 to 90 nm/s, and particularly preferably within a range from 8 to 80 nm/s. If the layer-forming rate is lower than 6 nm/s, the reflectance may be sometimes decreased by oxidation or the resistance to corrosion of the light-reflective layer may be impaired. If the layer-forming rate is greater than 95 nm/s, a temperature rise is remarkable to sometimes cause warping of the substrate.

Substrate

Examples of the substrate material include glass; polycarbonates, acrylic resins such as polymethyl methacrylate; vinyl chloride-type resins such as polyvinyl chloride and copolymers of polyvinyl chloride; epoxy resins; amorphous polyolefins; polyesters; and metals such as aluminum. If necessary, these materials may be used in combination. Among these, polycarbonates and amorphous polyolefins are preferred, with polycarbonates being particularly preferred in view of the moisture proofness, dimensional stability and low cost. Polycarbonates are most preferable. The thickness of the substrate is preferably 1.1±0.3 mm.

A guide-groove for tracking or a pre-groove representing information such as address signal is formed on the substrate. The pre-grooves are preferably formed directly on the substrate when a resin such as polycarbonate is injection molded or extrusion molded.

Further, the pre-grooves may be formed by providing a pre-groove layer. As the material for the pre-groove layer, a mixture of at least one monomer (or oligomer) of acrylic acid monoester, diester, triester and tetraester and a photopolymerization initiator. The pre-groove layer can be formed, for example, by first applying a coating liquid containing the acrylic acid ester and the polymerization initiator on a precisely constructed stamper, placing a substrate on the coated solution layer, then irradiating UV-rays through the substrate or the stamper to cure the coated layer and adhere the substrate to the coated layer, and then peeling the substrate from the stamper. The thickness of the pre-groove layer is generally from 0.01 to 100 μm, and preferably from 0.05 to 50 μm.

In order to achieve higher storage density, it is preferable to use a substrate having a pre-groove with a track pitch that is narrower than the track pitch in a conventional CD-R or DVD-R. It is essential that the track pitch of the pre-groove is 200 to 400 nm, and preferably 250 to 350 nm.

It is also essential that the depth of the pre-groove (groove depth) is 10 to 150 nm, preferably 20 to 100 nm, and more preferably 30 to 80 nm. The semi-value width thereof is preferably 50 to 250 nm, and more preferably 100 to 200 nm.

An undercoat layer is preferably disposed on the surface of the substrate at the side disposed with the light-reflective layer, in order to improve surface flatness and enhance adhesion.

Examples of the material for the undercoat layer include polymeric substances such as polymethyl methacrylate, acrylic acid/methacrylic acid copolymer, styrene/maleic anhydride copolymer, polyvinyl alcohol, N-methylol acrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate and the like; and surface-modifying agents such as silane coupling agents.

The undercoat layer can be formed by preparing a coating liquid by dissolving or dispersing the above material in a suitable solvent, and applying the coating liquid to the substrate surface by spin coating, dip coating, extrusion coating, or the like. The thickness of the undercoat layer is generally 0.005 to 20 $\mu$m, and preferably 0.01 to 10 $\mu$m.

Recording Layer

The recording layer preferably contains a dye having a maximum absorption wavelength for a laser beam so that information can be recorded and reproduced by irradiating a laser beam having a wavelength of 500 nm. Examples of the dye used in the invention include cyanine dyes, oxonol dyes, metal complex dyes, azo dyes and phthalocyanine dyes.

Specific example of the dye include the dyes described in JP-A Nos. 4-74690, 8-127174, 11-53758, 11-334204, 11-334205, 11-334106, 11-334207, 2000-43423, 2000-208513 and 2000-158818, as well as the dyes such as triazole, triazine, cyanine, merocyanine, aminobutadiene, phthalocyanine, sinnamic acid, viologen, azo, oxonol, benzooxazole, and bonzotriazole. Among these, cyanine, aminobutadiene, benzotriazole and phthalocyanine are preferable.

The recording layer is formed by preparing a coating liquid by dissolving the above dye optionally together with a binder in a suitable solvent, and applying the coating liquid to the light-reflective layer formed on the substrate surface to form a layer, followed by drying the layer. Further, various kinds of additives such as an antioxidant, a UV-absorbent, a plasticizer and a lubricant may be added to the coating liquid depending on the purposes.

Further, as a method of dissolving the dye and the binder, a method such as an ultrasonic treatment, homogenizer treatment, disper treatment, sand mill treatment or stirrer treatment can be applied.

Examples of the solvent for preparing the coating liquid for the recording layer include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol, n-butanol and diacetone alcohol; fluorine-based solvents such as 2,2,3,3-tetrafluoropropanol; and glycol ethers such as ethylene glycol monomethyl ether, ethylene glycol monoethyl ether and propylene glycol monomethyl ether. These solvents may be used singly or in combination of two or more kinds thereof by taking into consideration of the solubility of the dye and the binder to be used.

Examples of the binder include naturally occurring organic polymeric substances such as gelatin, cellulose derivatives, dextran, rosin and rubber; and synthetic organic polymers, for example, hydrocarbon-based resins such as polyurethane, polyethylene, polypropylene, polystyrene and polyisobutylene; vinyl-type resins such as polyvinyl chloride, polyvinylidene chloride, polyvinyl chloride/polyvinyl acetate copolymers, acrylic resins such as methylpolyacrylate and methyl polymethacrylate; polyvinyl alcohol; chlorinated polyethylene, epoxy resin, butyral resin, rubber derivatives, and pre-condensates of heat-curable resins, e.g., phenol/formaldehyde resins. If the binder is used together with the recording material in the recording layer, the amount of the binder used is preferably 0.01 to 50 times (by mass ratio), and more preferably 0.1 to 5 times, relative to the dye. Incorporation of the binder in the recording layer can improve the storability of the recording layer.

The concentration of the dye in the thus prepared coating liquid is generally 0.01 to 10% by mass, and preferably 0.1 to 5% by mass.

Examples of the coating method include spraying, spin coating, dipping, roll coating, blade coating, doctor roll coating and screen printing. The recording layer may comprise a single layer or several layers. The thickness of the recording layer is usually 20 to 500 nm, and more preferably 50 to 300 nm.

Coating may be conducted at temperatures from 23 to 50° C. without any problem, preferably from 24 to 40° C., and more preferably from 25 to 37° C.

In order to raise lightfastness of the recording layer, various kinds of anti-fading agents may be incorporated in the recording layer.

Generally, a singlet oxygen quencher is used as the anti-fading agent. Singlet oxygen quenchers already described in publications such as patent specifications can be used.

Specific examples of the singlet oxygene quencher include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, Japanese Patent Application Publication (JP-B) Nos. 1-38680 and 6-26028, German Patent No. 350399, and *Journal of the Chemical Society of Japan*, October 1992, p.1141.

The amount of the anti-fading agent such as the singlet oxygen quencher is usually 0.1 to 50% by mass, preferably 0.5 to 45% by mass, more preferably 3 to 40% by mass, and particularly preferably 5 to 25% by mass, relative to the total solid content in the recording layer.

Also, a barrier layer may be formed on the surface of the thus formed recording layer for improving the adhesion with the cover layer and enhance the storability of the dye. The barrier layer is a layer comprising oxides, nitrides, carbides and sulfides of any one of Zn, Si, Ti, Te, Sm, Mo and Ge. Further, the barrier layer may comprise a hybrid such as $ZnS-SiO_2$. The barrier layer may be formed by sputtering, vapor deposition ion plating or the like, and the thickness is preferably from 1 to 100 nm.

Cover Layer

The cover layer is formed on the surface at the side provided with the recording layer using an adhesive or a pressure sensitive adhesive (via a bonding layer or a pressure sensitive adhesive layer).

Preferably, the cover layer has a transmittance of 80% or higher, and more preferably 90% or higher with respect to a laser beam used for recording and reproducing information. Further, the cover layer comprises a resin sheet preferably having a surface roughness Ra of 5 nm or less. Examples of the resin sheet include polycarbonate (PUREACE manufactured by Teijin Co., PANLIGHT, manufactured by Teijin Kasei), cellulose triacetate (FUJITACK, manufactured by Fuji Film), and PET (LUMILLAR, manufactured by Toray Co.), with polycarbonate and cellulose triacetate being more preferred. Incidentally, the surface roughness Ra of the cover layer is determined depending on the kinds of the resins used, the layer-forming method employed or the presence or absence of the filler incorporated. The surface roughness Ra of the cover layer is measured, for example, using HD2000 (manufactured by WYKO Co.).

The thickness of the cover layer is suitably specified in consideration of the wavelength of the laser beam irradiated for recording and reproducing information or an NA. Preferably, the thickness is 0.03 to 0.15 mm, and more preferably 0.05 to 0.12 mm. Further, the total thickness of the adhesive layer or pressure sensitive adhesive layer and the cover layer is preferably 0.09 to 0.11 mm, and more preferably 0.095 to 0.105 mm.

As the adhesive, for example, a UV-curable resin, an EB-curable resin and a heat-curable resin is preferable, with the UV-curable resin being particularly preferred.

Preferably, the adhesive is, for example, coated in a predetermined amount on a bonding surface of a laminate (recording layer and the like), the cover sheet is adhered thereto, and then the adhesive is spread uniformly by spin-coating between the laminate and the cover sheet, followed by curing.

The amount of the adhesive applied is adjusted such that the thickness of the bonding layer to be finally formed falls within a range of 0.1 to 100 $\mu$m, preferably within a range of 0.5 to 50 $\mu$m, and more preferably within a range of 10 to 30 $\mu$m.

When a UV-curable resin is used as the adhesive, the UV-curable resin itself is applied, or alternatively, the resin is dissolved in an appropriate solvent such as methyl ethyl ketone and ethyl acetate to prepare a coating liquid, and the thus prepared liquid may be supplied from a dispenser to the surface of the laminate. In order to prevent warping of the optical information recording medium, the UV curable resin for constituting the bonding layer preferably has a smaller coefficient of construction. As the UV-curable resin, for example, "SD-640" (manufactured by Dal-Nippon Ink Chemical Industry Co.) can be used.

Any UV-irradiator may be used for curing the UV-curable resin, and a pulse-type UV irradiator is preferably used. As the UV irradiating conditions, the pulse interval is preferably msec or less, and more preferably $\mu$sec or less. While there is no particular limitation to the amount of light irradiated per pulse, it is preferably 3 kW/cm$^2$ or less, and more preferably 2 kW/cm$^2$ or less. Further, while there is no particular limitation to the number of irradiation times, it is preferably 20 or less and, and more preferably 10 or less.

Further, an acrylic, rubber-based or silicon-based pressure sensitive adhesives can be used as the pressure sensitive adhesive. The acrylic pressure sensitive adhesive is preferable from the standpoints of transparency and durability. As the acrylic pressure sensitive adhesive, those comprising as the main ingredient, for example, 2-ethylhexyl acrylate or n-butyl acrylate and a copolymer that is produced between, for example, a short-chained alkyl acrylate or methacrylate such as methyl acrylate, ethyl acrylate or methyl methacrylate, and acrylic acid or methacrylic acid, acryloamide derivatives, maleic acid, hydroxyethyl acrylate or glycidyl acrylate to form a crosslinking site with a crosslinking agent are preferably used for improving the cohesiveness. The glass transition temperature (Tg) and the crosslinked density may be varied by properly controlling the mixing ratio of the main ingredient, the short-chained ingredient and the ingredient for forming the crosslinking site, and the types of the ingredients.

The crosslinking agent that is usable in combination with the pressure sensitive adhesive is, for example, an isocyanate-type crosslinking agent. Examples of the usable isocyanate-type crosslinking agent include isocyanates such as tolylene diisocyanate, 4,4'-diphenylmethane diilsocyanate, hexamethylene diisocyanate, xylylene diisocyanate, naphthylene-1,5-diisocyanate, o-toluidine isocyanate, isophorone diisocyanate and triphenylmethane triisocyanate, reaction products between the above isocynates and polyalcohols, and polyisocyanates formed by condensation of isocyanates. Commercially available products of the isocynates are, for example, CORONATE-L, CORONATE HL, CORONATE 2030, CORONATE 2031, MILLIONATE MR, and MILLIONATE HTL, manufactured by Nippon Polyurethane Co.; TAKENATE D-102, TAKENATE D-110N, TAKENATE D-200, TAKENATE D-202, manufactured by Takeda Yakuhin Co, Ltd.; DESMODULE L, DESMODULE IL, DESMODULE N, and DESMODULE HL, manufactured by Sumitomo Bayer Co., or the like.

Additional Layer

In the optical information recording medium according to the invention, various interlayers may be further disposed besides the arbitrary layers described above. For example, an interlayer for improving the reflectance and adhesion may be disposed between the light-reflective layer and the recording layer.

The surface roughness of the optical information recording medium of the invention, at the side at which the laser beam is incident, is properly determined depending on the surface roughness of the cover layer used, the surface roughness of the substrate, preparation conditions for the light-reflective layer, the kinds and layer-forming conditions for the recording layer, the kinds and coating conditions for the adhesive layer, and the kinds and coating conditions for the protective layer.

Information is recorded on and reproduced from the optical information recording medium of the invention, for example, as follows. First, the optical information recording medium is irradiated, through an objective lens, with a laser beam for recording information from the side at which the cover layer is disposed while rotating the medium at a constant linear speed (0.5–10 m/sec) or at a constant angular velocity. By this irradiation from the side provided with the cover layer, the recording layer absorbs the laser light such as a blue-violet laser beam (having a wavelength, e.g., 405 nm), and the temperature rises locally at the irradiated portion. The rise in temperature causes a physical or chemical change to alter the optical properties, whereby information is recorded. The thus recorded information is reproduced by irradiating a blue-violet laser beam from the side provided with the cover layer while rotating the optical information recording medium at a predetermined constant linear speed and detecting the light reflected.

As the laser light source having an oscillating wavelength of 500 nm or less, for example, a blue-violet semiconductor laser having an oscillating wavelength of 390 to 415 nm and a blue-violet SHG laser having a central oscillating wavelength of 425 nm are preferably used.

Further, in order to increase recording density, an NA of the objective lens used for pick-up is preferably 0.7 or higher and, and more preferably 0.85 or higher.

EXAMPLES

The present invention is described in more detail by way of the examples given below. It should be understood that the invention is not limited to the examples.

Example 1

The grooved side of a spirally grooved substrate made of polycarbonate, which was obtained by injection molding and which had a thickness of 1.1 mm, an outer diameter of 120 mm and an inner diameter of 15 mm and had groove depth of 30 nm, width of 150 nm and track pitch of 340 nm, was DC sputtered with aluminum (Al purity: 99.9% by mass or higher) in an Ar atmosphere to form a light-reflective layer. Detailed conditions for sputtering are shown in Table 1.

2 g of dye A represented by the following chemical formula was dissolved in 100 ml of 2,2,3,3-tetrafluoropropanol to thereby prepare a dye coating liquid. The dye coating liquid thus prepared was spin-coated on the light-reflective layer by varying rotational frequency from 300 to 4000 rpm at 23° C. and 50% RH. Then, the coated layer was kept at 23° C. and 50% RH for 1 hour to form a recording layer (in-groove thickness: 100 nm; on-groove thickness: 70 nm).

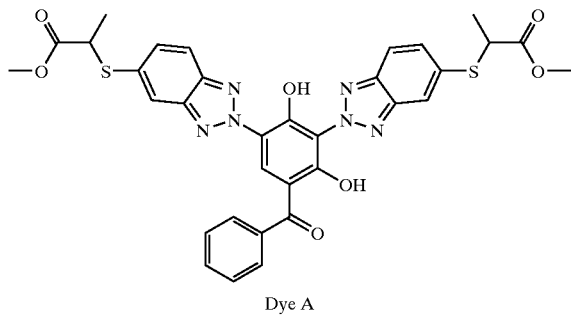

Dye A

After forming the recording layer, an annealing treatment was carried out in a clean oven. The annealing treatment was conducted while supporting the substrate to a vertical stack pole using a space, and kept at 40° C. for 1 hour.

Then, ZnS—$SiO_2$ (ZnS: $SiO_2$=8:2 (mass ratio)) was RF sputtered on the recording layer to form a barrier layer (50 nm thickness), whereby a laminate was prepared. The sputtering conditions for forming the barrier layer were as follows.

| | |
|---|---|
| Power | 4 kW |
| Pressure | 2 × $10^{-2}$ hPa |
| Time | 10 sec |

Thereafter, a UV-curable adhesive (ex8204, manufactured by Dai-Nippon Ink Co.) was dispensed on the thus formed barrier layer by substantially circulating the laminate for about one turn while fixing a nozzle. Then, a cover layer made of polycarbonate (PUREACE, 120 mm outer diameter, 15 mm inner diameter, 85 μm thickness, manufactured by Teijin Ltd.) was placed under centering, and the adhesive was spread over the entire surface at 5000 rpm for 3 sec to shake off an excessive adhesive. Then, UV-rays were irradiated with rotating to cure the adhesive, to finally produce an optical information recording medium of Example 1. At this point, the thickness of the bonding layer was 15 μm and the total thickness of the cover sheet and the adhesive layer was 100 μm. The bonding layer could be adhered without bubbles contaminated.

Evaluation of Recording Characteristics

C/N (Carrier/Noise Ratio)

600 nm pits were formed under the conditions of a recording power of 5 mW and a linear speed of 5 m/s. The produced optical information recording medium was assessed using an apparatus for evaluating recorded and reproduced information (DDU 1000, manufactured by Pulse Tech Co.) equipped with a 405 nm laser and an NA 0.85 pick-up. The C/N ratio was measured using a spectrum analyzer. The obtained results are shown in Table 1.

Unrecorded Noise

The produced optical information recording medium was assessed using an apparatus for evaluating recorded and reproduced information (DDU 1000, manufactured by Pulse Tech Co.) equipped with a 405 nm laser and an NA 0.85 pick-up. The width and unrecorded reflectance of unrecorded RF signals were measured. The value obtained by dividing the width of RF signals by the unrecorded reflectance is defined as an unrecorded noise. The obtained results are shown in Table 1.

TABLE 1

| | Material for Light-Reflective Layer | Thickness (nm) | Ar Flow Rate (sccm) | Sputtering Power | Layer-forming Time | Unrecorded Noise | C/N (dB) |
|---|---|---|---|---|---|---|---|
| Example 1 | Al | 80 | 5 | 2 | 5 | 5 | 52 |
| Example 2 | Al | 40 | 5 | 2 | 2.5 | 4 | 52 |
| Example 3 | Al | 150 | 5 | 2 | 9 | 10 | 51 |
| Example 4 | Al | 80 | 5 | 1 | 10 | 21 | 53 |
| Example 5 | Al | 80 | 5 | 0.5 | 20 | 33 | 51 |
| Example 6 | Al | 80 | 2 | 2 | 4.4 | 30 | 49 |
| Example 7 | Al—Ti | 60 | 7 | 5 | 1.6 | 4 | 51 |
| Example 8 | Al | 60 | 7 | 5 | 1.6 | 5 | 51 |
| Example 9 | Al | 70 | 5 | 2 | 4.4 | 8 | 51 |
| Example 10 | Al | 70 | 3 | 2 | 4.4 | 10 | 50 |
| Example 11 | Al | 70 | 20 | 2 | 4.4 | 15 | 50 |
| Example 12 | Al | 70 | 22 | 2 | 4.4 | 20 | 50 |
| Example 13 | Al | 40 | 7 | 1 | 5.5 | 30 | 50 |
| Example 14 | Al | 60 | 7 | 1.5 | 5 | 15 | 51 |
| Example 15 | Al | 70 | 7 | 2 | 4.4 | 7 | 51 |
| Example 16 | Al | 70 | 7 | 7 | 1.2 | 10 | 50 |
| Example 17 | Al | 50 | 7 | 8 | 0.8 | 20 | 51 |

TABLE 1-continued

| | Material for Light-Reflective Layer | Thickness (nm) | Ar Flow Rate (sccm) | Sputtering Power | Layer-forming Time | Unrecorded Noise | C/N (dB) |
|---|---|---|---|---|---|---|---|
| Example 18 | Al | 25 | 7 | 5 | 0.5 | 10 | 50 |
| Example 19 | Al | 20 | 7 | 5 | 0.4 | 15 | 50 |
| Example 20 | Al | 60 | 7 | 5 | 1.6 | 5 | 52 |
| Example 21 | Al—Ta | 60 | 7 | 5 | 1.6 | 4 | 52 |
| Example 22 | Al—Cr | 60 | 7 | 5 | 1.6 | 5 | 51 |
| Comp. Ex. 1 | Ag | 80 | 5 | 2 | 5 | 60 | 47 |
| Comp. Ex. 2 | Au | 80 | 5 | 2 | 5 | 50 | 45 |

Examples 2–5

Optical information recording media of Examples 2–5 were produced in a similar manner as in Example 1 except that the conditions for forming the light-reflective layer were changed as shown in Table 1.

The same experiment as in Example 1 was conducted for the thus produced optical information recording media and evaluated for recording characteristics. The results are also shown in Table 1 above.

Examples 6–19

The grooved side of a spirally grooved substrate made of polycarbonate (Pan Light AD5503 manufactured by Teijin Ltd.), which was obtained by injection molding and which had a thickness of 1.1 mm, an outer diameter of 120 mm, an inner diameter of 15 mm and had groove depth of 40 nm, width of 150 nm and track pitch of 320 nm, was DC sputtered with Al or Al alloy in an Ar atmosphere under the conditions shown in Table 1 to form a light-reflective layer. The aluminum alloy (Al—Ti) used in Example 7 contained 2 at % of Ti.

2 g of an organic compound represented by the following chemical formula was dissolved in 100 ml of methyl lactate by carrying out an ultrasonic treatment for two hours to thereby prepare a dye coating liquid. The dye coating liquid thus prepared was spin-coated on the light-reflective layer by varying rotational frequency from 300 to 4000 rpm at 23° C. and 50% RH. The thus formed recording layer had an in-groove thickness of 100 nm and an on-groove thickness of 70 nm.

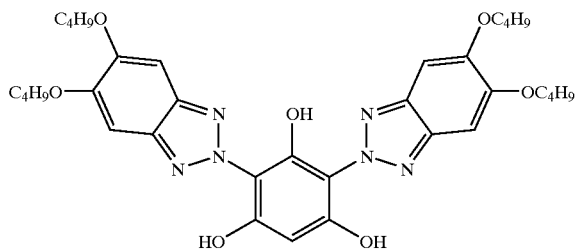

After forming the recording layer, an annealing treatment was carried out at 23° C. for 2 hour.

Then, ZnS—$SiO_2$ (ZnS:$SiO_2$=8:2 (mass ratio)) was RF sputtered on the recording layer to form a barrier layer (50 nm thickness), whereby a laminate was prepared. The sputtering conditions for forming the barrier layer were as follows.

| Power | 4 kW |
| Pressure | $2 \times 10^{-2}$ hPa |
| Time | 10 sec |

Then, a UV-curable adhesive (SD-661, manufactured by Dai-Nippon Ink Co.) was spin-coated on the thus formed barrier layer at 100 to 300 rpm. Then, a sheet made of polycarbonate (PUREACE, 80 μm thickness, manufactured by Teijin Ltd.) was overlaid and an adhesive was spread over the entire surface varying rotational frequency from 300 to 4000 rpm. Then, UV-rays were irradiated with rotating to cure the adhesive, and thus an optical information recording media of Examples 6 to 19 were produced. At this point, the thickness of the bonding layer was 20 μm and the total thickness of the cover sheet and the adhesive layer was 100 μm.

Evaluation of Recording Characteristics

The same experiment as in Example 1 was conducted for the thus produced optical information recording media and evaluated for recording characteristics. The results are also shown in Table 1 above.

Examples 20–22

The grooved side of a spirally grooved substrate made of polycarbonate (Pan Light AD5503 manufactured by Teijin Ltd.), which was obtained by injection molding and which had a thickness of 1.1 mm, an outer diameter of 120 mm, an inner diameter of 15 mm and had groove depth of 40 nm, width of 150 nm and track pitch of 340 nm, was DC sputtered with Al or Al alloy in an Ar atmosphere under the conditions shown in Table 1 to form a light-reflective layer. As to the aluminum alloy, Al—Ta used in Example 24 and Al—Cr used in Example 25 contained 2 at % of Ta and Cr, respectively.

2 g of an ORASOL BLUE GN (manufactured by Ciba Fine Chemical Inc.) was dissolved in 100 ml of 2,2,3,3-tetrafluoropropanol by carrying out an ultrasonic treatment for two hours to thereby prepare a dye coating liquid. The dye coating liquid thus prepared was spin-coated on the light-reflective layer by varying rotational frequency from 300 to 4000 rpm at 23° C. and 50% RH. The thus formed recording layer had an in-groove thickness of 100 nm and an on-groove thickness of 70 nm.

Then, ZnS—$SiO_2$ (ZnS:$SiO_2$=8:2 (mass ratio)) was RF sputtered on the recording layer to form a barrier layer (50 nm thickness), whereby a laminate was prepared. The sputtering conditions for forming the barrier layer were as follows.

| | |
|---|---|
| Power | 4 kW |
| Pressure | $2 \times 10^{-2}$ hPa |
| Time | 10 sec |

Then, a UV-curable adhesive (SD-661, manufactured by Dai-Nippon Ink Co.) was spin-coated on the thus formed barrier layer at 100 to 300 rpm. Then, a sheet made of polycarbonate (PUREACE, 80 μm thickness, manufactured by Teijin Ltd.) was overlaid and an adhesive was spread over the entire surface varying rotational frequency from 300 to 4000 rpm. Then, UV-rays were irradiated with rotating to cure the adhesive, and thus an optical information recording media of Examples 20 to 22 were produced. At this point, the thickness of the bonding layer was 20 μm and the total thickness of the cover sheet and the adhesive layer was 100 μm.

Evaluation of Recording Characteristics

The same experiment as in Example 1 was conducted for the thus produced optical information recording media and evaluated for recording characteristics. The results are also shown in Table 1 above.

Comparative Example 1

Optical information recording medium of Comparative Example 1 was produced in a similar manner as in Example 1 except that aluminum in light-reflective layer was replaced with silver (Ag).

The same experiment as in Example 1 was conducted for the thus produced optical information recording medium and evaluated for recording characteristics. The results are also shown in Table 1 above.

Comparative Example 2

Optical information recording medium of Comparative Example 2 was produced in a similar manner as in Example 1 except that aluminum in light-reflective layer was replaced with gold (Au).

The same experiment as in Example 1 was conducted for the thus produced optical information recording medium and evaluated for recording characteristics. The results are also shown in Table 1 above.

As seen from the results shown in Table 1, it is revealed that the optical information recording media of Examples 1 to 22 which contained aluminum or aluminum alloy in the light-reflective layer were excellent in the recording characteristics of C/N ratios and unrecorded noises. Specifically, it is found that when the optical information recording media were produced employing the sputtering conditions to form the light-reflective layer (Ar flow rate, sputtering power and layer-forming time) within the specified range, remarkably reduced unrecorded noise (below 10%) was obtained to demonstrate excellent recording characteristics. It is considered that since the optical information recording medium of the invention included the specific light-reflective layer, the heat energy generated by laser beam irradiation was effectively utilized for forming the pits.

On the other hand, it is indicated that the optical information recording media of Comparative Examples 1 and 2 were low in the properties of the C/N ratio and the unrecorded noise, as compared with the optical information recording media of Examples 1–22. This is assumed that since the light-reflective layer contained Ag or Au having a higher heat conductivity than aluminum or aluminum alloy, the heat energy generated by laser beam irradiation was dissipated owing to its high heat conductivity, thus failing to form satisfactory pits.

As described above, the present invention provides an optical information recording medium that exhibits excellent recording characteristics and achieves cost-reduced production by including aluminum or an aluminum alloy in a light-reflective layer.

What is claimed is:

1. An optical information recording medium comprising a substrate including a groove that has a track pitch of 200 to 400 nm and a depth of 10 to 150 nm, the substrate having successively disposed thereon a light-reflective layer, a recording layer and a cover layer, wherein information is recordable and reproducible by irradiating a laser beam having a wavelength of 500 nm or less from a side of the medium disposed with the cover layer, and the light-reflective layer contains aluminum or an aluminum alloy.

2. The optical information recording medium according to claim 1, wherein the aluminum contained in the light-reflective layer is pure aluminum.

3. The optical information recording medium according to claim 1, wherein the aluminum alloy contained in the light-reflective layer comprises, in an amount of 1 wt % or less, at least one selected from the group consisting of Si, Mg, Ag, Au, Pt and Cu as a foreign element.

4. The optical information recording medium according to claim 1, wherein the light-reflective layer has a thickness of 20 to 200 nm.

5. The optical information recording medium according to claim 1, wherein the light-reflective layer is formed at a layer-forming rate of 6 to 95 nm/s.

6. The optical information recording medium according to claim 1, wherein the substrate comprises polycarbonate or amorphous polyolefin.

7. The optical information recording medium according to claim 6, wherein the substrate has a thickness of 1.1±0.3 mm.

8. The optical information recording medium according to claim 1, further comprising an undercoat layer on a surface of the substrate at a side provided with the light-reflective layer.

9. The optical information recording medium according to claim 8, wherein the undercoat layer has a thickness of 0.005 to 20 μm.

10. The optical information recording medium according to claim 1, wherein the recording layer contains a dye selected from the group consisting of cyanine dyes, oxonol dyes, metal complex dyes, azo dyes, and phthalocyanine dyes.

11. The optical information recording medium according to claim 10, wherein the recording layer further contains at least one additive selected from the group consisting of an antioxidant, a UV-absorbent, a plasticizer and a lubricant.

12. The optical information recording medium according to claim 11, wherein the recording layer further contains an anti-fading agent.

13. The optical information recording medium according to claim 12, wherein the anti-fading agent is a singlet oxygen quencher.

14. The optical information recording medium according to claim 13, wherein the singlet oxygen quencher is contained in an amount of 0.1 to 50% by mass relative to a total solid content of the recording layer.

15. The optical information recording medium according to claim 1, further comprising a barrier layer on a surface of the recording layer.

16. The optical information recording medium according to claim 15, wherein the barrier layer comprises a material selected from the group consisting of oxides, nitrides, carbides and sulfides, of any one of Zn, Si, Ti, Te, Sm, Mo and Ge.

17. The optical information recording medium according to claim 1, wherein the cover layer has a transmittance of 80% or higher with respect to the laser beam.

18. The optical information recording medium according to claim 17, wherein the cover layer has a surface roughness Ra of 5 nm or less.

19. The optical information recording medium according to claim 18, wherein the cover layer has a thickness of 0.03 to 0.15 mm.

20. The optical information recording medium according to claim 1, wherein light source of the laser beam having a wavelength of 500 nm or less is one of a blue-violet semiconductor laser having an oscillating wavelength of 390 to 415 nm and a blue-violet SHG laser having a central oscillating wavelength of 425 nm.

* * * * *